July 26, 1960          J. W. GRAY          2,946,260
BOMB RANGE COMPUTER
Filed Sept. 14, 1945
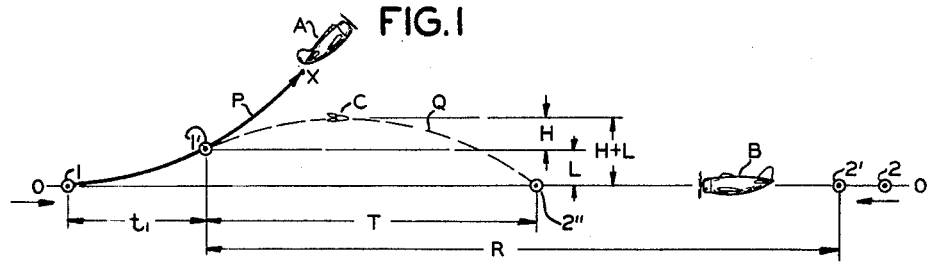
FIG. 1
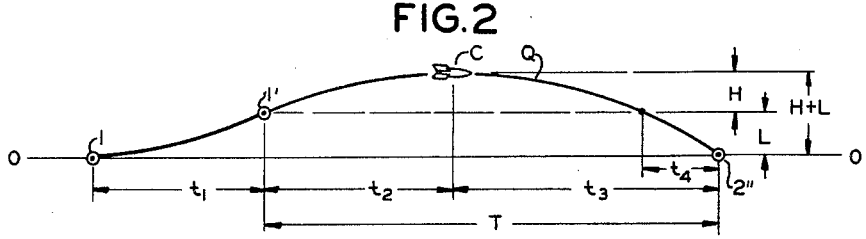
FIG. 2
FIG. 3
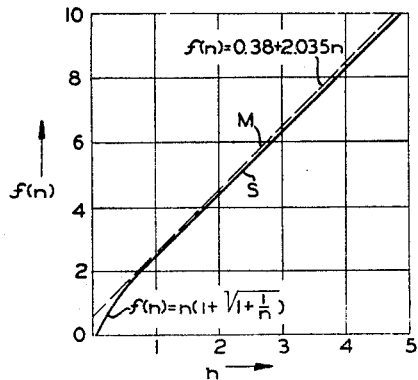
FIG. 4
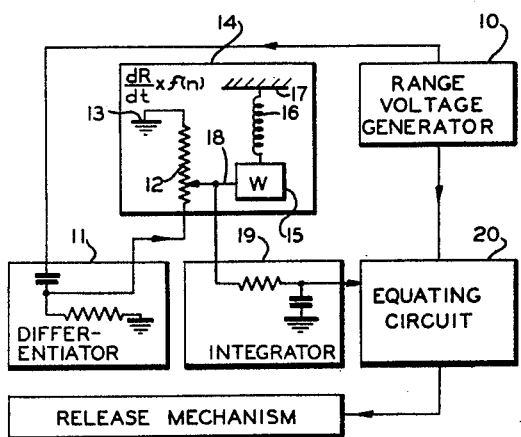
FIG. 5
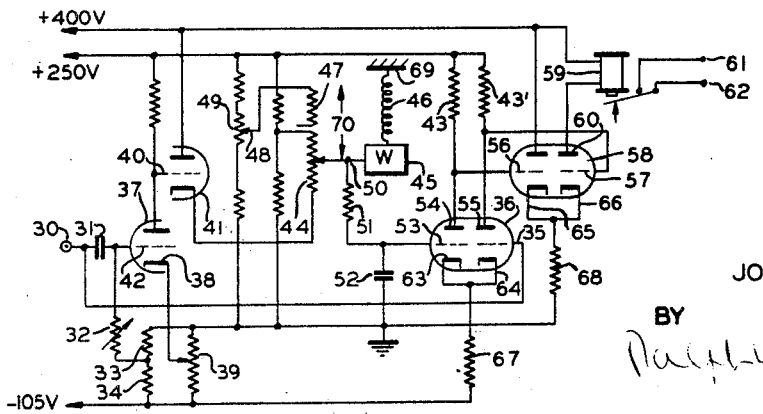
INVENTOR
JOHN W. GRAY
BY
ATTORNEY

United States Patent Office 2,946,260
Patented July 26, 1960

2,946,260
BOMB RANGE COMPUTER

John W. Gray, Cambridge, Mass., assignor, by mesne assignments, to the United States of America as represented by the Secretary of the Navy Filed Sept. 14, 1945, Ser. No. 616,395

2 Claims. (Cl. 89—1.5)

This invention relates to the general problem of hurling an object from one aircraft in flight at a second aircraft flying at substantially the same altitude, and more particularly to the automatic release of a bomb in the toss bombing of one aircraft by another.

If two aircraft are flying at approximately the same altitude, it is possible for one aircraft to toss a bomb at the other merely by zooming upward and releasing its bomb at the proper instant. The bomb will then describe a path in flight similar to that of a ball thrown in an underhand fashion. This method of bombing is known as "Toss Bombing." A prior optical system has been evolved for toss bombing bomb-release control in which the time for a collision between the two aircraft is one of the important factors. A second important factor is the upward acceleration of the bomb-tossing aircraft.

An electronic system is herein disclosed for accomplishing the same result. As will be explained hereinbelow, the important factors in an electronic circuit for controlling the release of a bomb in toss bombing are the range between the two aircraft, the rate at which the range between the two aircraft is closing, and the upward acceleration of the bomb-tossing aircraft during a zoom. Such an electronic system makes use of range information continuously furnished by a radio echo detection system. The range between the two aircraft is compared with the product of the range rate and the integral with respect to time of some function of the upward acceleration of the bomb-tossing aircraft. When these two quantities are equal, the bomb is automatically released.

It is therefore an object of my invention to provide an electronic control system for releasing a bomb in a toss-bombing system.

It is a further object of my invention to provide such an electronic control system that will release a bomb in a toss-bombing operation automatically at the right instant for contact with the target plane or planes.

It is a still further object of my invention to provide such an electronic control system that will be light in weight, inexpensive and trouble-free.

Other objects and features of my invention will become apparent upon a careful consideration of the following detailed description when taken together with the accompanying drawings, the figures of which illustrate the theory of and a typical embodiment of the invention.

Fig. 1 is a graph illustrating the general problem of toss bombing;

Fig. 2 is an expanded illustration of Fig. 1 showing the path taken by a bomb during a toss-bombing operation;

Fig. 3 is a graph showing a linear arbitrary function of the vertical acceleration of a zooming aircraft compared with a true function of the same acceleration;

Fig. 4 is a block diagram of a system for releasing a bomb at the proper instant during a toss-bombing operation; and Fig. 5 is a circuit diagram constructed in accordance with the invention as illustrated in the block diagram of Fig. 4.

In Fig. 1 a first aircraft A at a position 1 in space and a second aircraft B at a second position 2 are flying toward each other at substantially the same altitude along a line 0–0. The first aircraft A commences a toss-bombing operation by zooming upward toward the position X along a curved path, P. After a certain time $t_1$ the first aircraft A arrives at a subsequent position 1′. In the same time $t_1$ the second aircraft B arrives at a subsequent position 2′. At the instant of arrival at this new position 1′, the first aircraft A releases its bomb C. The bomb C describes a path Q, indicated by a dotted line, similar to that described by a ball when tossed underhand at an object. The distance R to which the range between the two aircraft A and B has closed at the instant the bomb C is released is the distance between the two aforementioned subsequent position points, 1′ and 2′. The time T taken for the bomb to go from the release position 1′ to the last position 2″ that will be had by the second aircraft at the instant the bomb and the second aircraft meet is the free flight time of the bomb C. At the instant of release, namely at the release position 1′, the first aircraft A has risen or executed an upward motion L. After release, the bomb C executes an additional upward motion H. The total fall of the bomb C in returning to the altitude 0–0 at which the two planes A and B were flying is therefore $H+L$. Fig. 1 is thus illustrative of the general problem of toss bombing.

In Fig. 2, there is shown a graph illustrating the complete path Q of a bomb C which is tossed by one aircraft A at another B. The two aircraft A and B are not shown in Fig. 2. The dimensions H, L, T, and $t_1$ are the same as the corresponding dimensions of Fig. 1. The first aircraft A is at a first position 1 initially and at a subsequent position 1′ when the bomb C is released. The second aircraft is at the aforementioned last position 2″ when the bomb C comes in contact with it. The line 0–0 is again the line of flight or the altitude of both aircraft A and B prior to the initiation of the toss-bombing run by the first aircraft A.

The mathematics pertinent to the development of the apparatus of my invention will now be discussed. For the sake of simplicity, however, the derivation of this mathematics will first be made assuming that the upward acceleration $ng$ of the bombing plane A is constant and it will then be shown that the result obtained is still a good approximation even if the acceleration $ng$ is varying quite radically. As shown in the diagram of Fig. 2 the upward acceleration $ng$ of the first aircraft A occurs in the time interval $t_1$ from the start of a toss-bombing operation to the instant of release. The succeeding time interval $t_2$ is the time from release until the upward velocity, $v$, of the bomb C is zero. The upward velocity at the time of release is:

$$v = ngt_1 = gt_2$$

Where:

$v$ = the upward velocity of the bomb tossing aircraft, A, at the point of release 1′.

$ng$ = the upward acceleration of the zooming aircraft, A, here assumed to be of a constant value.

$g$ = the acceleration due to gravity of the free bomb C.

$n$ = a numerical value which when multiplied by g., the acceleration due to gravity, gives the upward acceleration of the zooming aircraft, A. $t_1$ and $t_2$ have heretofore been defined.

Therefore:

$$t_2 = nt_1$$

The upward displacement L at the time of release of the bomb C is:

$$L = \frac{vt_1}{2}$$

The upward displacement H after release of the bomb C is:

$$H = \frac{vt_2}{2} = nL$$

The total vertical displacement $H+L$ is therefore:

$$H+L = L(n+1) = \frac{vt_1(n+1)}{2}$$

or $$H+L = \frac{ngt_1^2(n+1)}{2}$$

It is also true that:

$$L+H = \left(\frac{gt_3^2}{2}\right)$$

where $t_3$ = the time it takes the bomb C to move back from the vertex of its flight to the original line of flight 0–0. Therefore:

$$t_3 = t_1\sqrt{n(n+1)} = nt_1\sqrt{1+\frac{1}{n}}$$

The free flight time T of the bomb C will then be:

$$T = t_2 + t_3 = nt_1 + nt_1\sqrt{1+\frac{1}{n}}$$

or $$T = nt_1\left(1 + \sqrt{1+\frac{1}{n}}\right)$$

In the herein to be disclosed system the range R between the two aircraft A and B, and the rate $R_r$ at which the range R is changing with respect to time are continually measured, so that at any instant the time T required for the first aircraft A or its projectile C to reach the target aircraft B is their ratio:

$$\frac{R}{R_r} = T$$

This is also the free flight time T of the bomb C. Thus:

$$T = \frac{R}{R_r} = nt_1\left(1 + \sqrt{1+\frac{1}{n}}\right) \quad (1)$$

This last derived Equation 1 implies that in a toss bombing operation, release of the bomb C should take place at that instant in the zoom when the elapsed time of zoom $t_1$ is such as to result in the equality of the Equation 1.

The foregoing Equation 1 was derived for the special case of constant acceleration $ng$ and is of no use if the acceleration $ng$ varies during the toss. However, if the average of the acceleration $ng$ during the toss is used rather than the instantaneous value the Equation 1 is not only still valid for the hereinabove discussed special case, but is an excellent approximation even with varying acceleration $ng$. The formula is then:

$$T = \frac{R}{R_r} = \int_0^{t_1} n\left(1 + \sqrt{1+\frac{1}{n}}\right) dt \quad (2)$$

The quantity $$\frac{1}{n}$$

in the radical is due to the last distance L as shown in Figs. 1 and 2 which the bomb must traverse vertically during a relatively short interval of time $t_4$ to get back to its original line of flight 0–0. If it were not for this distance L the integral would be simply $$\frac{2v}{g}$$

which is T minus the time $t_4$ to traverse L. Thus if it were not for the distance L, the integral formula would be perfectly valid for any mode of acceleration.

As hereinabove stated, the last developed Formula 2 is an excellent approximation of the true facts even with varying acceleration $ng$. Thus the acceleration $ng$ may increase uniformly from zero at the start of a toss to a value $Ng$ at the release point 1' where "N" is a finite quantity. Then $n$ is a function of time:

$$n = \frac{N}{t_1}t$$

We find in such a case that the approximation of Equation 2 is accurate within 8 percent where $N=\frac{1}{2}$ and is better for greater values of N, since as N increases in value L becomes smaller in comparison with H. The following table illustrates these values.

| N | 0.5 | 1 | 1.5 | 2 | 3 | 4 | 5 | 6 | 10 |
|---|---|---|---|---|---|---|---|---|---|
| $T/t_1$ exact | .729 | 1.263 | 1.78 | 2.29 | 3.30 | 4.31 | 5.31 | 6.32 | 10.32 |
| $T/t_1$ approx | .787 | 1.34 | 1.87 | 2.39 | 3.41 | 4.42 | 5.43 | 6.44 | 10.44 |
| error percent | 8 | 6 | 5 | 4.2 | 3.2 | 2.6 | 2.2 | 2 | 1.2 |

Thus the integral approximation Equation 2 for the value of T is found to be approximately true to within 8 percent for the poorest possible case and to within a little over 1 percent for an extreme case in which the final value of the acceleration $ng$ is relatively large, in the neighborhood of ten times that of gravity.

It is relatively impractical to try to design a device to integrate the function $$f(n) = n\left(1 + \sqrt{1+\frac{1}{n}}\right)$$

with respect to time. However a linear approximation to this function may be used satisfactorily instead. One such satisfactory approximation is $f(n) = (0.38+2.035n)$, The integral approximation then becomes:

$$\frac{R}{R_r} = \int_0^{t_1}(0.38+2.035n)dt \quad (3)$$

These two functions of $n$ are illustrated graphically in Fig. 3 for comparison. A dotted line M illustrates the function of $n$ equal to $0.38+2.035n$. A solid line S illustrates the function of $$n \text{ equal to } n\left(1 + \sqrt{1+\frac{1}{n}}\right)$$

The horizontal axis going from 0 to 5 illustrates increasing values of "$n$" to the right. The vertical axis going from 0 to 10 units in steps of two illustrates increasing values of "function of $n$" going upward. As can be seen the graphs of the two functions run closely parallel except in the case where $n$ is about one-half. Thus if the upward acceleration $ng$ of the zooming aircraft A is constant and is over one-half gravity $g$ the integration error is substantially 2 percent or less.

It can be shown further that if the vertical acceleration $n$ is varying uniformly during the toss from zero up to $Ng$ the integral $$\frac{R}{R_r} = \int_0^{t_1} (0.38 + 2.035n) dt$$

will yield a value differing from the correct values of T only by a substantially constant error. The fact that the error is substantially constant suggests that after the usual mode of vertical acceleration $n$ during a toss bombing run has been discovered the error may be reduced greatly by readjustment of a zero setting. For instance the errors could have been held down by using the function:

$$f(n) = 0.23 + 2.035n$$

This change in the constant factor from 0.38 to 0.23 may be made by a zero adjustment in a device operating in accordance with the principles hereinabove discussed.

As can be seen from Fig. 1, the angle at which the bomb trajectory Q will intercept the target path 0–0 will be small, thus allowing for a relatively large range error, corresponding to the errors above discussed in connection with the mathematics, without missing the target completely. A bomb of the proper type will explode within lethal range within this allowable error.

The bomb releasing apparatus of this invention should continually compare the output of an integrator with the range and range rate in such a way that when the equation integral $$\frac{R}{R_r} = \int_0^{t_1} (0.38 + 2.035n) dt$$

is true the bomb will be released. Under this condition the start of the climb or zoom may be at any range R within practical limits. The design considerations are simplified however if the apparatus can be arranged to multiply the integral by range rate $R_r$ and release when the product equals range, R.

The equation becomes:

$$R = R_r \int_0^{t_1} (0.38 + 2.035n) dt \qquad (4)$$

In Fig. 4 is illustrated a block diagram of an apparatus which performs the equating of the two sides of the last developed Equation 4 and releases a bomb when the equality of said equation is arrived at. A range voltage generator 10 which may be of the type disclosed in Fig. 6 of U.S. Patent No. 2,479,909 issued August 23, 1949, to S. Darlington, not shown, generates a voltage proportional to the range R between the two aircraft A and B, as shown in Fig. 1. This voltage is fed to a differentiator 11 which produces a voltage proportional to the time rate of change, of the aforementioned range voltage. This last voltage is proportional then to the range rate $R_r$, and may be represented as $$\frac{dR}{dt}$$

The differentiated voltage $$\frac{dR}{dt}$$

is then fed to a potentiometer 12 which is connected from the output of the differentiator 11 to ground 13. The potentiometer 12 is part of an accelerometer assembly 14, which includes a mechanical accelerometer comprising a weight 15 suspended from a spring 16 and a firm structure 17. The weight 15 is fixedly attached to the movable arm 18 of the aforementioned potentiometer 12 in such a fashion that when the accelerometer circuit 14 is lifted bodily by a zooming aircraft, as the aircraft A in Fig. 1, the inertia of the weight 15 causes the weight 15 and movable arm 18 to move downward on the resistor part of the potentiometer 12 toward the higher voltage end thereof. Thus the accelerometer assembly 14 produces a signal at the movable arm 18 of the potentiometer 12 which is the product of the differentiated range voltage $$\frac{dR}{dt}$$

and a function $f(n)$ of the acceleration upward $n$ of the aircraft carrying the apparatus. The weight 15 and the spring 16 are chosen to imitate or follow the function of $n = 0.38 + 2.035n$. Thus when the zooming aircraft is accelerated upward the voltage present at the movable arm 18 of the potentiometer 12 is equal to or proportional to the quantity $$\frac{dR}{dt} f(n) = R_r (0.38 + 2.035n)$$

The output voltage from the movable arm 18 of the potentiometer 12 is fed to an integrator circuit 19 which integrates the linear function of $n$-times the range rate $R_r$ from the time zero to $t_1$. Since $R_r$ is relatively constant this is equivalent to integrating the linear function of $n$ alone from zero to time $t_1$ alone, and multiplying that result by the range rate, $R_r$. The output signal of the integrator 19 is therefore proportional to the value of $$R_r \int_0^{t_1} (0.38 + 2.035n) dt$$

The output of the integrator 19 and the output of the range voltage generator 10 are each fed to an equating circuit 20. When the two inputs of the equating circuit 20 are substantially equal, that is, when the quantities R and the output of the integrator 19 are equal satisfying the equation $$R = R_r \int_0^{t_1} (0.38 + 2.035n) dt$$

a bomb release mechanism 21 is automatically operated. Thus the apparatus of the block diagram of Fig. 4 will operate to release a bomb when the last Equation 4 developed hereinabove is satisfied.

Fig. 5 illustrates a circuit diagram of an embodiment of my invention constructed in accordance with the block diagram of Fig. 4. The output of a range voltage generator, not shown, is introduced into the circuit of Fig. 5 at an input terminal 30. The range voltage signal is then fed through a differentiator circuit comprising a capacitor 31 and a variable resistor 32 and a fixed resistor 33 in series connected at the far end to ground. A resistor 34 cooperates with the thereunto connected resistor 33 to provide a voltage divider supplying grid biasing voltage to the grid 42 of the electron tube 37. The range voltage signal is fed in parallel to the right hand grid 35 of a double triode difference amplifier tube 36. The aforementioned differentiator circuit produces a voltage which is proportional to the rate of change with respect to time $R_r$ of the input range voltage R. The differentiated voltage produced by the differentiator circuit is fed to the grid 42 of the electron tube 37 and amplified in that electron tube. The level at which amplification takes place is determined by the voltage setting for the cathode 38 of the electron tube 37. The voltage level of the cathode 38 is set by a potentiometer 39 connected from a source of negative voltage, here of the value of 105 volts, to ground.

The amplified differentiated voltage is connected to the grid 40 of another electron tube 41. The two electron tubes 37 and 41 may be in the same envelope or may be two separate single triode tubes. The second electron tube 41 further transfers the differentiated voltage by means of cathode follower action to a potentiometer 44 which cooperates with accelerometer mechanism comprising the weight 45 and the spring 46 and support 69 in substantially the same manner as described in connection with the accelerometer assembly 14 in Fig. 4. The weight 45 and spring 46 are chosen to follow the function $$fn = 0.38 + 2.035n$$

as are the corresponding elements in Fig. 4. The top half or lower voltage end 47 of the potentiometer 44 is separated from the rest of the potentiometer 44, and connected to a source of voltage at a tap 48 on another potentiometer 49. This arrangement provides greater accuracy in the apparatus at the start of a zoom. The last mentioned potentiometer 49 is in a resistance network connected from a source of positive voltage, here having a value of +250 volts, to ground.

The output of the accelerometer circuit is taken from a tap 50 which is the movable tap of the potentiometer 44 and resistor 47. The tap 50 is movable along a substantially vertical path 70 with the weight 45. The voltage on the tap 50 is fed to an integrator circuit comprising a resistor 51 and a capacitor 52. The output of the integrator circuit is fed to the left hand grid 53 of the double triode tube 36. The signal on the left-hand grid 53 of the double triode tube 36 is thus the integrated voltage proportional to the quantity $$R_r \int_0^{t_1} (0.38 + 2.035n) dt$$

that is to be compared with the voltage proportional to the range R present on the grid 35.

The double triode tube 36 is a difference amplifier arranged for voltage amplification, and the signals on the anodes 54 and 55 thereof are fed to the two grids 56 and 57, respectively, of a second double triode tube 58 which is also a difference amplifier arranged for power amplification. A relay 59 is in the circuit of the right-hand anode 60 of the last double triode tube 58 and closes a circuit represented by the two contacts 61 and 62 when the two voltages on the grids 53 and 35 of the first difference amplifier tube 36 are substantially equal, that is, when $$R = R_r \int_0^{t_1} (0.38 + 2.035n) dt$$

is substantially true. The two cathodes 63 and 64 of the first difference amplifier tube 36 are connected together and to a source of negative voltage, herein having a value of 105 volts, through a resistor 67 which may be of the order of 100,000 ohms. Similarly two cathodes 65 and 66 of the last difference amplifier tube 58 are connected together and through a resistor 68 which also may be of the order of 100,000 ohms to ground.

The operation of the apparatus of Fig. 5 will now be reviewed and further explained. The range voltage signal introduced at the terminal 30 is differentiated in the differentiator comprising the capacitor 31 and the resistors 32 and 33 as hereinabove set forth. The differentiated voltage proportional to $R_r$ is applied to the potentiometer 44. The accelerometer comprising the weight 45 and the spring 46, the spring 46 being affixed to a permanent part of the framework of the apparatus 69, moves vertically downward a distance 70 depending upon the vertical acceleration $ng$ of the zooming aircraft carrying the apparatus. As the vertical acceleration $ng$ of the aircraft increases, the weight 45 moves further downward along the potentiometer 44. Therefore the signal present in the movable tap 50 increases as the upward acceleration $ng$ of the zooming aircraft increases. Thus the signal present at the movable tap 50 is the product of the differentiated range voltage proportional to $R_r$ and the vertical acceleration $ng$ of the aircraft carrying the apparatus. The weight 45 and the spring 46 are preferably so chosen that the function obeyed by the motion of the weight 45 as the zooming aircraft is accelerated vertically is substantially:

$$fn = 0.38 + 2.035n$$

where $n$ is the vertical acceleration factor of the zooming aircraft all as hereinabove set forth. The voltage present at the movable tap 50 is then integrated in the integrator circuit comprising the resistor 51 and capacitor 52 during the time $t_1$ of said vertical acceleration, which time is from the start of the zoom of the aircraft to that time at which the bomb is released. The output of the integrator circuit is, as aforementioned, a voltage proportional to $$R_r \int_0^{t_1} (0.38 + 2.035n) dt$$

The integrator output voltage is then fed to the left-hand grid 53 of the first difference amplifier 36, as aforementioned. Simultaneously the range voltage proportional to R is fed to the right-hand grid 35 of the same difference amplifier tube 36.

The difference amplifier tube 36 will have these two signals present, one on each of its two grids 53 and 35. Initially the range voltage present at the grid 35 will be the larger signal and the integrator output voltage at the grid 53 will be the smaller signal. The integrator output voltage will start at zero since, initially, there is no zoom and hence no upward acceleration and therefore "$n$" starts at a value of zero. Simultaneously, the range, R, will have its largest value at the start of a zoom. Therefore the right-hand half only of the difference amplifier tube 36 will be conductive and there will be a voltage drop present in the relatively large common cathode resistor 67 which will cause the right-hand cathode 64 to become slightly positive with respect to the right hand grid 35. Due to the fact that the anode voltage present at the anodes 54 and 55 may be as high as 250 volts, the cathode 64 of the right-hand half of the difference amplifier tube 36 is very slightly higher in positive potential than the corresponding grid 35 of that tube. However, since the right hand grid 35 has a higher positive voltage initially than the left-hand grid 53 of the tube 36, and since the cathodes 63 and 64 are connected together, it follows that the cathode 63 is at a substantially higher potential than the left-hand grid 53. Therefore the left-hand half of the tube 36 will be non-conducting initially. Due to the presence of resistors 43 and 43' in the anode circuit, the voltage present at the left-hand anode 54 will be high with respect to the voltage present at the right-hand anode 55 of the first difference amplifier tube 36.

As the voltage present at the left-hand grid 53 rises, the voltage present at the right-hand grid 35 falls. The voltage present at the right-hand grid 35 will constantly decrease during a bombing attack because as the bombing plane approaches the target plane the range R between the two planes will decrease. The voltage present at the left-hand grid 53 of the tube 36 will increase during the attack because as the bombing plane zooms upward its vertical acceleration increases and the integral of the function of that acceleration from zero to the time $t_1$ of releasing the bomb will consequently become greater in value. When the voltage present at the left-hand grid 53 becomes substantially equal to the voltage present at the right-hand grid 35, the left-half of the first difference amplifier tube 36 will start to conduct current and when the voltage present at the left-hand grid 53 exceeds the voltage present at the right-hand grid 35 all conduction will take place in the left-hand half and conduction will cease in the right-hand half of the first difference amplifier tube 36. Thus, in the region where the voltages on the two grids 53 and 35 of the first difference amplifier tube 36 are equal, the left-hand half of the difference amplifier tube 36 will begin to conduct and the right-hand half of the same tube will substantially at the same time cease to conduct current.

Simultaneously the second difference amplifier tube 58 will have a change of current conduction therein. The voltage present on the left-hand anode 54 of the first difference amplifier tube 36 is fed to the left-hand grid 56 of the second difference amplifier tube 58. Similarly the voltage present on the right-hand anode 55 of the first difference amplifier tube 36 is fed to the right-hand grid 57 of the second difference amplifier tube 58. As hereinabove mentioned, the second difference amplifier tube 58 is arranged in a circuit for power amplification and therefore has no resistors in its anode circuits. The second difference amplifier tube 58 functions in a manner substantially identical to the first difference amplifier tube 36 insofar as the conduction of current through its two halves is concerned. Thus when the voltage present at the left-hand grid 56 begins to drop, corresponding to a voltage drop in the left-hand anode 54 of the first difference amplifier tube 36, the voltage present at the right-hand grid 57 of the second difference amplifier tube 58 will begin to rise. When the voltages present at the two grids 56 and 57 of the second difference amplifier tube 58 are substantially equal, the current will begin to flow in the circuit of the right-hand anode 60 of this second difference amplifier tube 58. When current begins to flow in the circuit of the right-hand anode 60, the relay 59 will trip and close a release circuit represented by the terminals 61 and 62. The release circuit may be a bomb release circuit, or an indicator circuit as desired. Thus it is apparent that a bomb may be automatically released at the time when the two voltages present at the grids 53 and 35 of the first difference amplifier tube 36 are substantially equal, or when the relation $$R = R_r \int_0^{t_1} (0.38 + 2.035n) dt$$

is satisfied.

Zero setting of the apparatus illustrated in Fig. 5 is provided by the potentiometer 39 controlling the potential of the cathode 38 of the input electron tube 37. The magnitude of the voltage proportional to range rate $R_r$ is controlled by the setting of the potentiometer 32 in the differentiator circuit. These two adjustments provide means to correct the apparatus under operating conditions to remove from the system the errors introduced by the mathematical approximations made in the interests of simplified design.

The anode voltages 250 volts and 400 volts positive respectively, and the negative voltage, 105 volts, illustrated in the apparatus of Fig. 5, are representative voltages only, and not the only voltages that will work with an apparatus constructed in accordance with my invention.

Although I have shown and described only a certain specific embodiment of my invention, I am fully aware of the many modifications possible thereof. Therefore this invention is not to be limited except insofar as is necessitated by the prior art and the spirit of the appended claims.

I claim:

1. A computer for providing an indication of the time at which an explosive object should be released from an aircraft which starts out initially by flying a "heads on" collision course with a moving target and then suddenly executes a steep climb comprising, a signal generator carried by said aircraft for generating a first voltage whose amplitude is proportional to the instantaneous range between said aircraft and said target, a differentiating circuit, means for coupling said first voltage to said differentiating circuit whereby a second voltage whose amplitude is proportional to the rate of change of said range is developed, a function generator for generating a third voltage whose amplitude equals $.38 + 2.035n$ where $n$ is a numerical factor which when multiplied by $g$, the acceleration due to gravity, gives the vertical acceleration of the aircraft during said steep climb, means for multiplying the instantaneous amplitude of said second voltage by that of said third voltage to obtain a product voltage, an integrating circuit, means for coupling said product voltage to said integrating circuit and means for providing an indication when the amplitude of said first voltage and the output of said integrator are substantially equal.

2. In a computer as defined in claim 1 wherein said function generator includes a potentiometer, said potentiometer having a movable contact which is under the control of a mass suspended by a spring from a fixed point whereby said contact moves in response to the upward acceleration of said aircraft during said steep climb.

References Cited in the file of this patent

UNITED STATES PATENTS

| | | |
|---|---|---|
| 2,251,973 | Beale et al. | Aug. 12, 1941 |
| 2,433,284 | Luck | Dec. 23, 1947 |
| 2,438,112 | Darlington | Mar. 23, 1948 |
| 2,439,381 | Darlington | Apr. 13, 1948 |
| 2,441,657 | Blitz | May 18, 1948 |
| 2,444,678 | Sanders | July 6, 1948 |
| 2,479,909 | Darlington | Aug. 23, 1949 |
| 2,488,448 | Townes | Nov. 15, 1949 |